US005805441A

United States Patent [19]

Yamashita

[11] Patent Number: 5,805,441
[45] Date of Patent: Sep. 8, 1998

[54] EQUIPMENT MANAGEMENT SYSTEM

[75] Inventor: Yuji Yamashita, Osaka, Japan

[73] Assignee: Mita Industrial Co., Ltd., Osaka, Japan

[21] Appl. No.: 757,573

[22] Filed: Nov. 27, 1996

[30] Foreign Application Priority Data

Nov. 29, 1995 [JP] Japan .................................... 7-310258

[51] Int. Cl.$^{6}$ ........................................ G05B 15/00

[52] U.S. Cl. ......................... 364/130; 340/825.52; 399/8; 395/830

[58] Field of Search .............................. 399/8, 12, 9, 10; 364/130, 131, 138, 180, 140; 380/49; 379/245, 246; 395/651–653, 828–834, 186–188.01; 340/825.07, 825.52, 825.31, 825.53

[56] References Cited

U.S. PATENT DOCUMENTS 5,250,942 10/1993 Nakayama ......................... 340/825.52
5,444,517 8/1995 Nagashima ......................... 340/825.31
5,537,643 7/1996 Indo et al. ............................. 395/186
5,708,908 1/1998 Hirata et al. ................................ 399/8
5,708,909 1/1998 Yamashita et al. ......................... 399/8

*Primary Examiner*—Thomas C. Lee
*Assistant Examiner*—Steven R. Garland
*Attorney, Agent, or Firm*—Beveridge, DeGrandi, Weilacher & Young, LLP

[57] ABSTRACT

In a management system in which a plurality of copiers are managed by a host computer, initialization of a copier can be conducted easily and without a risk of causing damage to databases for other copiers. Each copier is provided with a device that is connected to the host computer so as to manage the copier. In initialization, when only a check code is entered into the device, the device conducts initialization by creating an initialization report but without filling in its copier ID area. The host computer distinguishes a copier ID number included in the initialization report, and searches a database by use of the check code. When no initialization date/time fields contain data, the host computer recognizes that the device has not yet been initialized, and initializes it. After initialization, the device stores the copier ID number received from the host computer into the copier ID area in a RAM, and transmits the copier ID number to the copier.

2 Claims, 9 Drawing Sheets

EQUIPMENT MANAGEMENT SYSTEM

BACKGROUND OF THE INVENTION

Field of the Invention

The present invention relates to an equipment management system in which communications control devices serving as terminal devices attached to electronic photocopiers are connected to a host computer installed at a management center managing those photocopiers over data communication lines, and particularly to an improvement on the initialization procedure for said devices.

Description of the Prior Art

Electronic photocopiers require various kinds of maintenance, such as replenishment of toner and paper, to maintain their copying functions. For this reason, the users of photocopiers usually sign a contract with a management center such as a maintenance service provider for long-term management of copiers in terms of various aspects of their maintenance as mentioned above. And, to enable the management center to carry out the contract without fail, there is usually provided a copier management system that is operated between the management center and the individual copiers regarded as terminals.

Generally, such a copier management system is constructed by connecting communications control devices attached to individual copiers to a host computer installed at a management center by way of public telephone lines. In this system, the host computer receives from the devices every kind of data, such as data for calling a serviceperson, concerning the copiers. Moreover, the host computer also initializes the devices of the individual copiers by setting on them a variety of data, such as the telephone number of the host computer, the time at which regular dialing takes place, and the number of copies permitted to be made under the contract. Thus, the devices communicate with the host computer on the basis of data set as described above, and, in this way, the copiers are collectively managed.

In such a copier management system, when a copier and a device have been newly installed on a user's site, user-related and copier-related data is first registered in the host computer, and then the device is initialized. During the initialization, the host computer communicates with the device, and sets an ID number on it. Thereafter, the device uses the ID number, instead of its individual model name or other, when it regularly communicates with the host computer to send data requested by it.

As described above, the device is initialized by setting on it the copier ID number, the telephone number of the host computer, and other data. In a conventional copier management system, such initialization is conducted by two operators, one at the host computer of the management center and the other at the device of the copier, communicating with each other by telephone.

However, in most cases, a device of a copier shares a single telephone line with a facsimile machine or telephone set, and accordingly the device is set for transmission only, so that, even when the device receives a call, the device will not answer it. For this reason, for the host computer to establish a connection with the device, a special operation is needed to enable the device to answer a call. Moreover, the initialization operation based on telephone communication takes a long time and requires two operators, and thus it is neither cost-effective nor work-efficient.

To solve these problems, another type of conventional copier management system allows the device to be initialized by operation on the copier side alone. In this improved copier management system, the data of a targeted copier is registered in the host computer in advance, whereas a copier ID number and a check code are issued from the host computer when initialization is conducted.

To conduct initialization, an operator is dispatched, with a memo on which the copier ID number and check code are noted down, to the site where the copier is installed. There, the operator first sets up the copier, and then conducts initialization of the device from the operation section of the copier. During this initialization, the operator enters the copier ID number and check code mentioned above as well as the telephone number of the host computer with which the device will communicate.

The device, on receiving an execution signal from the copier, dials the entered telephone number to start communication with the host computer. During the communication, the device checks the entered copier ID number and check code against those registered in the host computer, and, if they are found to agree completely, terminates the initialization. Note that a check code needs to be entered also in the earlier described conventional system before improvement.

However, in either of the above described conventional and improved systems, it is necessary to enter from the copier two codes, i.e. a copier ID number and a check code. The reason why a check code also needs to be entered is that, if initialization is conducted on the basis of a copier ID number alone, a wrongly entered number may cause damage in an existing database. For example, if, instead of a correct ID number "0010", a wrong number "0011" is entered under the condition where there already exists a copier with the ID number "0011", the database for that copier will be lost.

Such damage to databases can be effectively prevented by using two codes, i.e. a copier ID number and a check code, because, then, the identity of a copier can be checked doubly. However, according to this method, an operator is required to enter two different codes, each of which is composed of a complicated array of figures. This inevitably increases the risk of errors being made when the codes are entered. Of course, simple typing errors can be readily corrected by retyping, but there is no remedy when the operator has memorized a number incorrectly.

SUMMARY OF THE INVENTION

An object of the present invention is to provide a management system for image forming equipment, in which initialization of communications control devices can be achieved safely without the risk of causing damage to existing databases even though all required input for initialization is a single check code alone.

The present invention is applicable to an equipment management system comprising a terminal device that is attached to a managed piece of equipment so as to transmit equipment management data needed for managing that managed piece of equipment and a host computer that is connected to the terminal device by way of a data communication line so as to collectively manage equipment management data related to the terminal device. Here, the host computer sets initial data on the terminal device.

In addition, to achieve the above object, the terminal device is provided with a first report creating means which, under a condition that initialization has not yet been conducted, creates an initialization report solely based on a check code that is received from the managed piece of equipment during initialization and that identifies the managed piece of equipment, and a second report creating means which, when re-initialization is conducted, creates an initialization report based on at least three factors that are the check code, an ID number identifying the managed piece of equipment, and a condition that initialization has already been conducted.

Moreover, the host computer is provided with a report analyzing means for analyzing a report received from the terminal device, an initializing means which searches for an equipment management database based on the check code when an analysis result of the report analyzing means shows that the report does not include an ID number and which initializes the terminal device only when that database has not yet been initialized, and a re-initializing means which re-initializes the terminal device when an analysis result of the report analyzing means shows that the report includes an ID number.

In the above construction, it is also possible to use initialization date and time as the condition that initialization has already been conducted in the report creating means of the terminal device, so that the host computer is prevented from initializing the terminal device when the report analyzing means has detected initialization date and time in the report.

Owing to the above described construction, when a report is created by the first report creating means, i.e. when initialization is conducted on the basis of the check code alone, once initialization is conducted, the same ID number as that registered in the host computer is registered in the terminal device. Accordingly, when re-initialization is conducted, the terminal device, while communicating with the host computer, can allow the host computer to recognize that what is about to be conducted is re-initialization, since the correct ID number is already registered in the ID area of the terminal device. Moreover, even in case a wrong check code is entered and it accidentally agrees with the check code of the database for a managed piece of equipment that has not yet been initialized, the worst consequences, such as damage to databases already in operation, can be avoided, since it is a yet-to-be initialized database that is damaged.

Furthermore, when a report is created by the second report creating means, i.e. when re-initialization is conducted, a request for re-initialization on the basis of the ID number alone is ignored and therefore re-initialization is not conducted, since the report includes an initialization date that indicates that initialization has already been conducted. This is a precaution against possible damage to other databases already in operation.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
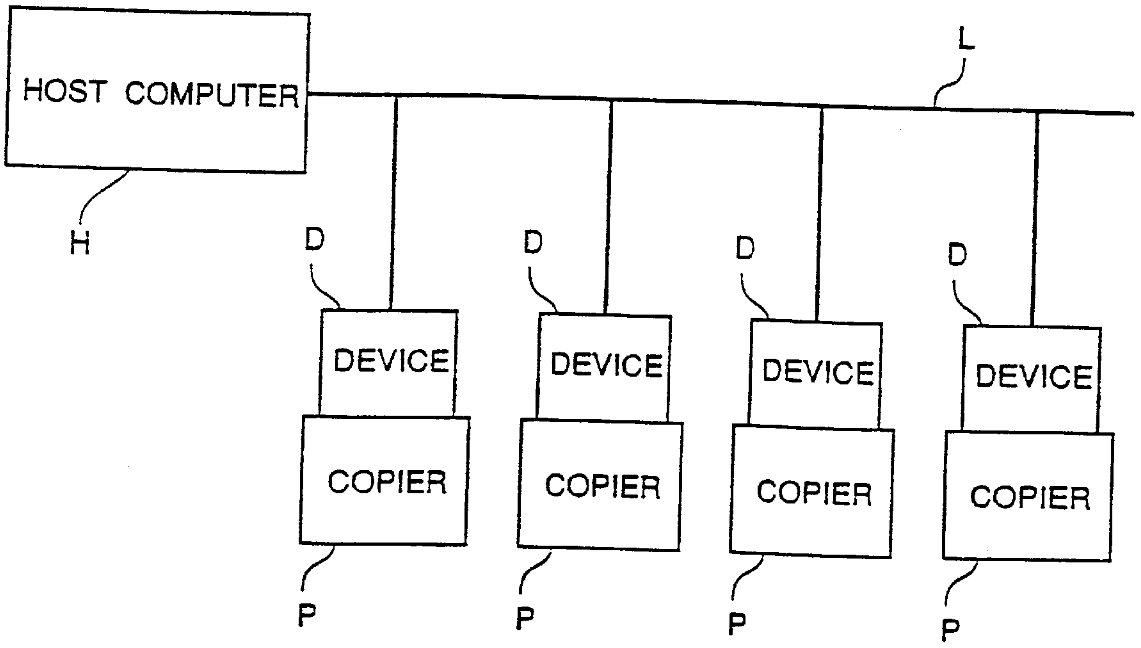
FIG. 1 is a block diagram showing the outline of the copier management system embodying the present invention.

Hereinafter, an embodiment in which the present invention is applied to a copier management system will be described with reference to the drawings. FIG. 1 schematically shows an example of such a copier management system. As shown in this figure, the copier management system consists of a plurality of copiers P as pieces of equipment to be managed and a host computer H installed at a management center and operated to manage maintenance of the copiers. The copiers P are each equipped with a communications control device D, serving as a terminal device, that is connected to the host computer H by way of a public telephone line L.

Figure 2:
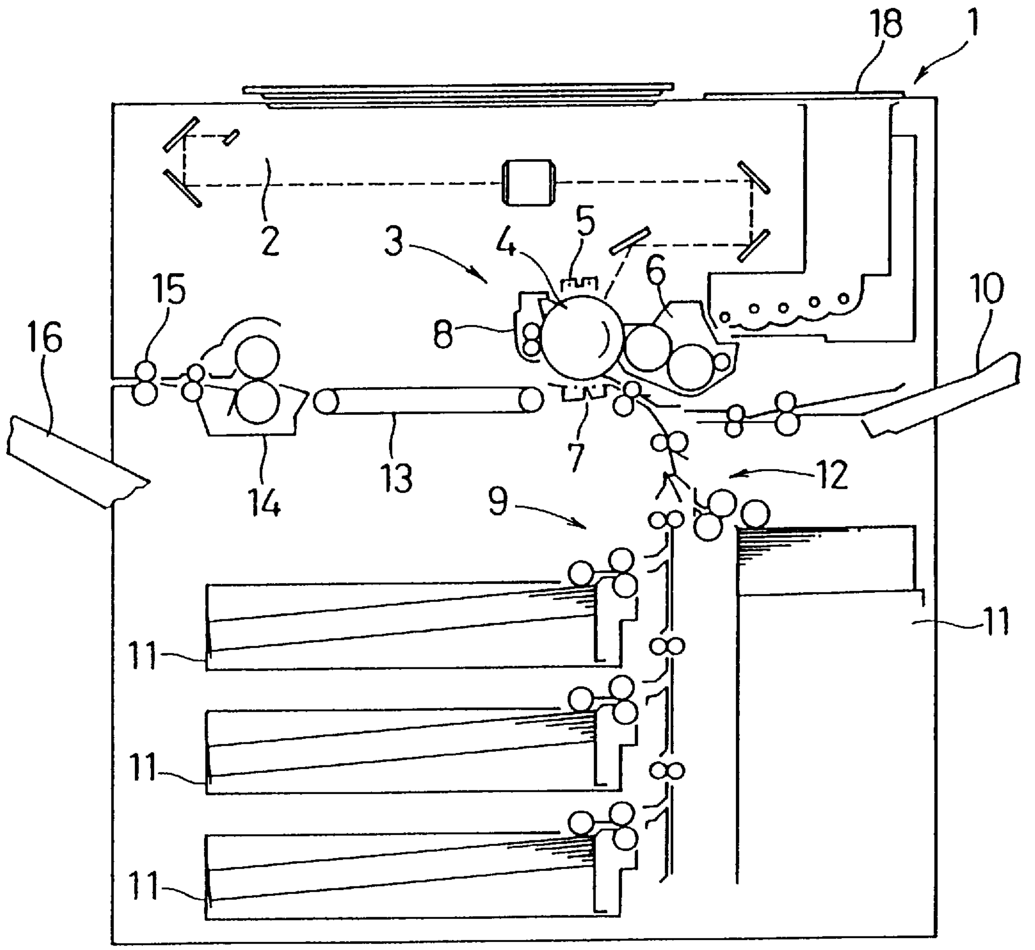
FIG. 2 is a cross-sectional view schematically showing the mechanical construction of the copier.

FIG. 2 shows the construction of the copier P. As shown in this figure, the copier P is provided with an optical system 2 fitted in the upper part of the body 1. The optical system 2 is for reading an original and comprises a light source, mirrors, a lens unit, and other components. In the central part of the copier body 1 is provided an image forming section 3 for forming an image with toner based on the read original. The image forming section 3 has a photosensitive drum 4, on the surface of which an electrostatic latent image is formed. Arranged around the photosensitive drum 4 are a main charger 5, a developing unit 6, a transferring and separating charger 7, and a cleaning unit 8.

In the lower part of the copier body 1 is provided a paper feed section 9. The paper feed section 9 comprises a bypass table 10 that is disposed in the right-hand part of the copier body 1 in FIG. 2, a plurality of paper feed cassettes 11 arranged vertically in the lower part of the copier body 1, and a paper transfer unit 12 for transferring paper sheets stocked in the bypass table 10 or paper feed cassettes 11 to the image forming section 3. Arranged on the downstream side of the image forming section 3 along the paper transfer direction are a paper ejecting conveyor 13 for conveying paper sheets to the left-hand part of the copier in FIG. 2, a fixing unit 14 for fixing a toner image on paper by fusion, ejecting rollers 15 for ejecting paper sheets after image fixation, and a ejected-paper tray 16 for stocking ejected paper sheets.

Figure 3:
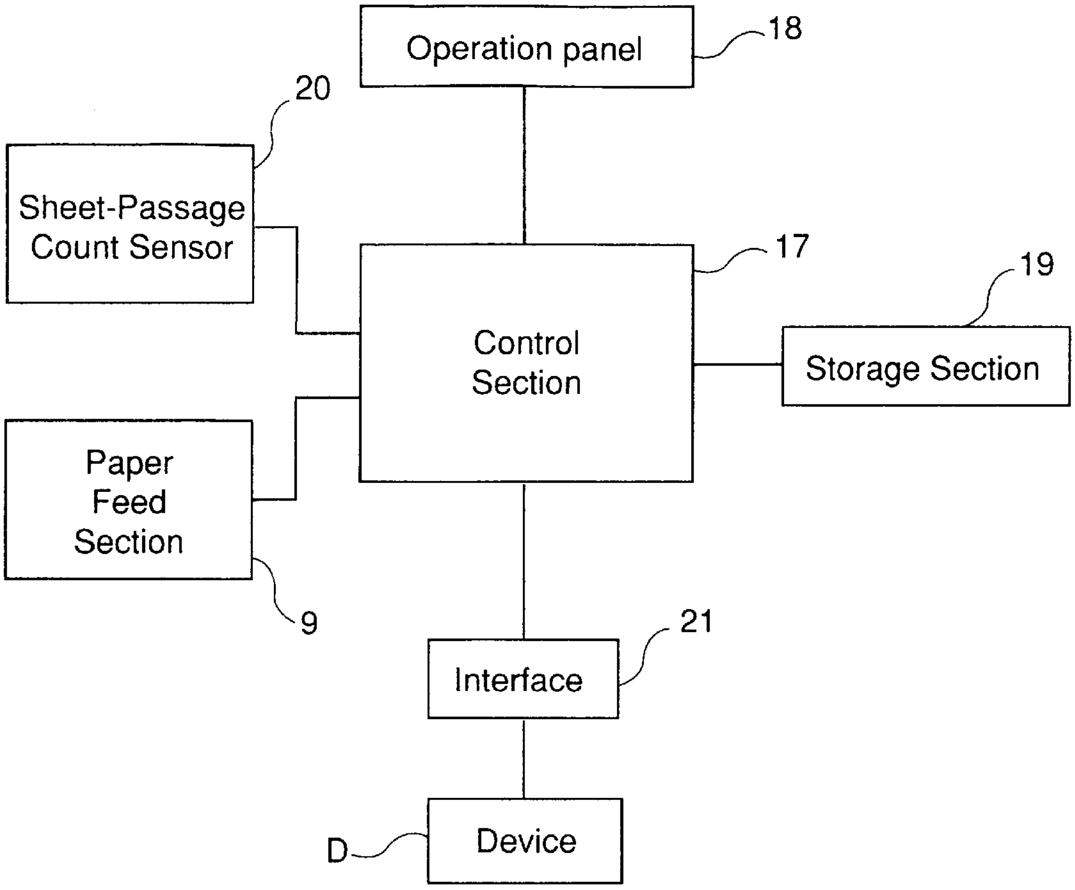
FIG. 3 is a block diagram showing the control system of the copier.

The copier body 1 is further equipped with a control section 17 shown in FIG. 3. The control section 17 is constructed as a microcomputer system including a CPU, a RAM, a ROM, a variety of drivers, and a variety of I/O ports. To the control section 17, an operation panel 18 is connected. As shown in FIG. 2, the operation panel 18 is disposed on the upper surface of the copier body 1, and includes an input keypad section and a display section composed of liquid crystal display devices, light emitting diodes, or other.

To the control section 17, a memory section 19 for storing a variety of operation data is connected. The memory section 19 stores, for example, the total count of copies produced by the copier body 1. Also connected to the control section 17 are a sheet-passage count sensor 20 for counting how many images have been formed, and a paper feed section 9 for feeding paper from paper feed cassettes 11.

In practice, the sheet-passage count sensor 20 consists of a plurality of sensors arranged in appropriate positions along the paper feed path from each paper feed cassette 11 through the image forming section 3 and the fixing unit 14 to the ejected-paper tray 16, so that, every time a complete and correct passage of a paper sheet is detected, the total count stored in the memory section 19 is incremented. Furthermore, the control section 17 is connected through an interface 21 to the copier management device D, so that the copy count counted by the sheet-passage count sensor 20 is transmitted to that device D.

Figure 4:
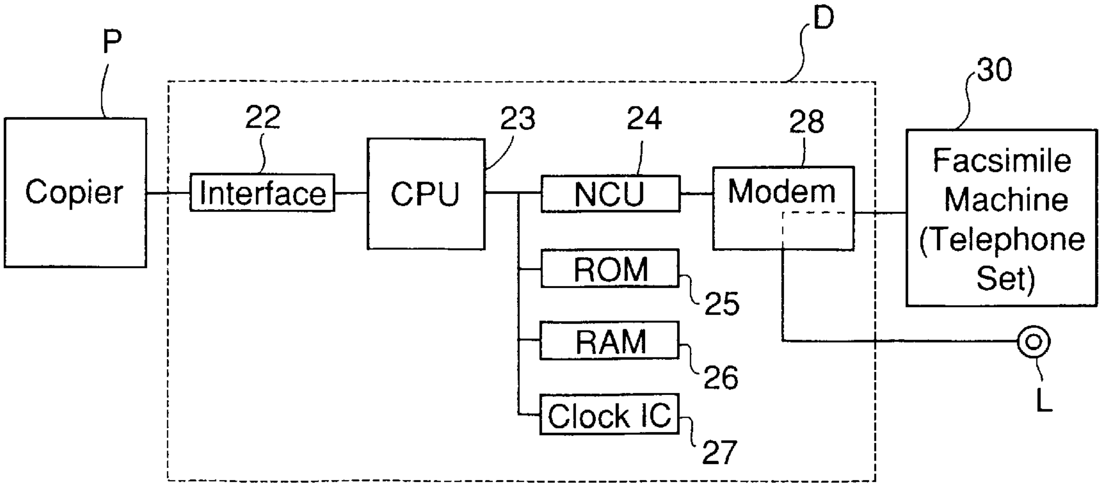
FIG. 4 is a block diagram showing the construction of the communications control device.

The copier management device D, which serves to transmit data required for managing the copier P, is, as shown in FIG. 4, equipped with a serial interface 22. The serial interface 22 is connected to a CPU 23. The CPU 23 is formed as a microcomputer system, and is connected to an NCU (network control unit) 24, a ROM 25, a RAM 26, and a clock IC 27. The NCU 24 is connected to a modem 28, and the modem 28 is in turn connected to a public telephone line L.

Note, however, that it is not practical to use the telephone line L exclusively for the device D of the copier. In reality, as described earlier, a telephone line for a facsimile machine (or telephone set) 30 is made to take a detour through the device D, and the device D is set for transmission only, so that, when the device D receives a call through the telephone line, the device D does not answer the call but transfers it to the facsimile machine or telephone set. Accordingly, in the management system of this embodiment, the host computer H cannot establish a connection with the device D without performing a special operation to enable the device to answer a call.

Figure 5:
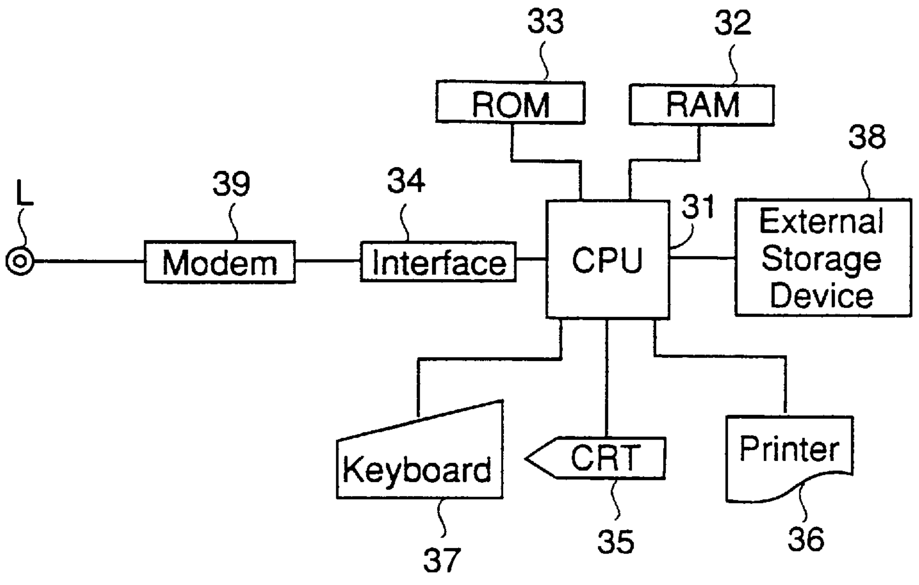
FIG. 5 is a block diagram showing the construction of the host computer.

As shown in FIG. 5, the host computer H is provided with a CPU 31, to which a RAM 32, a ROM 33, and an input/output interface 34 are connected. Moreover, to the CPU 31, a CRT 35 for displaying data, a printer 36 for printing data, a keyboard 37 for entering data, an external storage unit 38, and other devices are connected. The input/output interface 34 is provided with input/output terminals such as RS-232C ports, and is connected through a communications modem 39 to a public telephone line L.

The host computer H receives data transmitted from the device D and manages the copier P collectively on the basis of the received data. To achieve this, the host computer H not only receives from the device D every kind of data, including data for calling a serviceperson, concerning the copiers P, but also initializes data concerning the copier P. Here, initialization refers to an operation through which initial data, such as the telephone number of the host computer H, the time at which periodical dialing takes place, and the number of copies permitted to be made under the contract, is set on the device D.

Next, the above-mentioned initialization procedure in the above described copier management system will be described. To conduct initialization for a copier P, the data concerning the copier P needs to have been registered in the host computer H in advance. At the time of initialization, the host computer issues a check code for the copier P.

Figure 6:
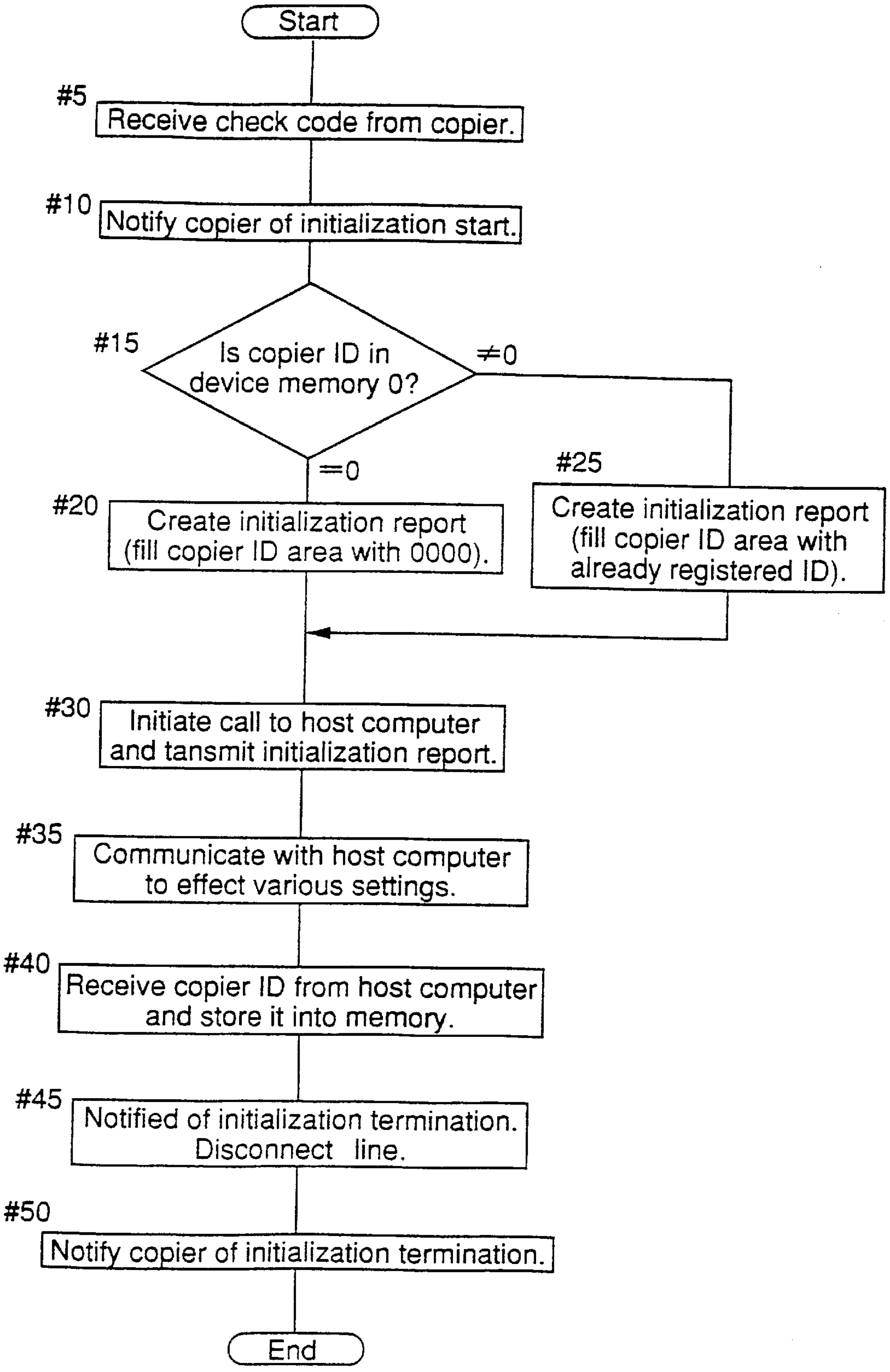
FIG. 6 is a flowchart showing the initialization procedure followed by the device when the copier transmits a check code.

FIG. 6 shows the initialization procedure followed by the device D when it receives a check code from the copier P. First, an operator visits the site where the copier P is installed. There, the operator, operating the keys on the operation panel 18 of the copier P, enters only the check code issued by the host computer H.

In FIG. 6, when, in step #5, the device D receives the check code from the copier P, then, in step #10, it notifies the copier P that it is about to start initialization and, in step #15, judges whether the copier ID area in the device memory (RAM 26) contains "0" or not. If the device D recognizes that the copier P is initialized for the first time, then, in step #20, the device D creates an initialization report and initiates a call to conduct initialization, but, at this time, without registering anything in the copier ID area. Note that, at this stage, the copier ID area actually contains "0000", since nothing has ever been written in the device memory 26 at the time when the copier is initialized for the first time.

If, in step #15, the device D finds that the copier ID area in the device memory 26 does not contain "0", then, in creating an initialization report in #25, the device D fills the copier ID area with "0000". When the device D completes an initialization report in this way, then, in step #30, it initiates a call to the host computer H to transmit thereto the initialization report thus created.

Typically, an initialization report is a code like:

```
01-0000-123456-950615-1530-XXXXXXXXXXXXXXXX
(a) (b)  (c)     (d)    (e)
```

In the above code, "01" in portion (a) indicates that this code is an initializing report, "0000" in portion (b) represents a copier ID number, "123456" in portion (c) represents a check code. Furthermore, "950615" in portion (d) represents an initialization execution date, denoting Jun. 15, 1995 in this case, and "1530" in portion (e) represents an initialization start time, denoting 15:30 in this case.

Figure 7:
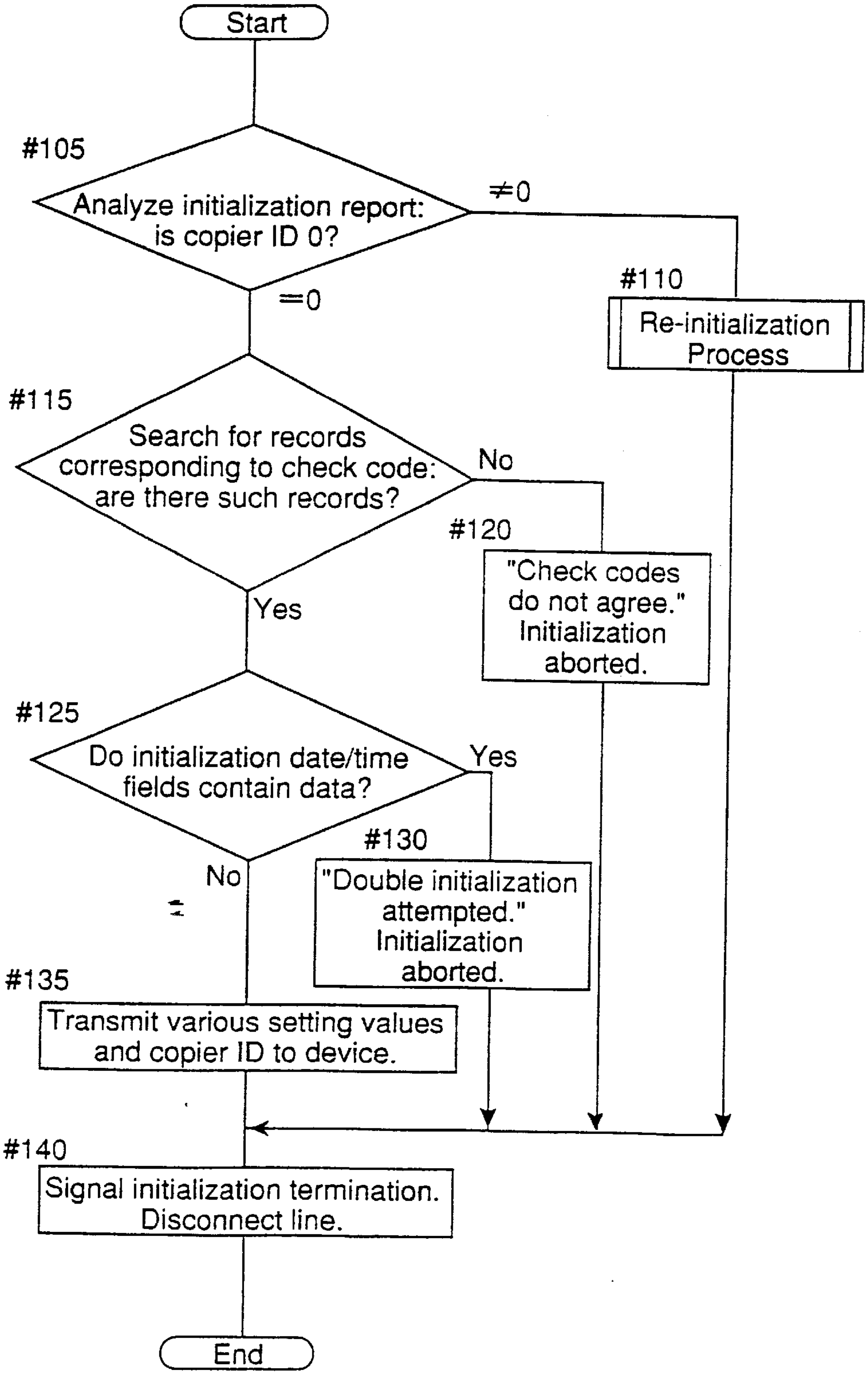
FIG. 7 is a flowchart showing the initialization procedure followed by the host computer when it receives a initialization report.

FIG. 7 shows the initialization procedure followed by the host computer when it receives an initialization report. In FIG. 7, when the host computer H receives an initialization report from the device D, then, in step #105, the host computer H analyzes the report to distinguish the copier ID number. If the copier ID number is found to be "0000", the host computer H recognizes that the copier P is initialized for the first time. If the copier ID number contains a significant code, then, in step #110, the host computer H executes a subroutine for re-initialization.

When the host computer H recognizes that initialization is conducted for the first time, then, in step #115, the host computer H searches its database for existing records corresponding to the check code. If there exist no such records, then, in step #120, the host computer H aborts initialization on the grounds of an improper check code. If there exist any records corresponding to the check code in the database, then, in step #125, the host computer H judges whether the initialization date/time fields in the database contain any actual initialization dates/times or not. If there exist any initialization dates/times, then in step #130, the host computer H aborts initialization on the grounds of double initialization in order to prevent initialization from being conducted doubly.

If there exist no data in the initialization data/time fields, the host computer H recognizes that initialization is conducted for the first time, and thus it initializes the device D, in step #135. Initialization of the device D is achieved by transmitting various setting values and the copier ID number to the device D. On completion of initialization, in step #140, the host computer H notifies the device D that initialization has been completed, and then disconnects the telephone line to terminate the device initialization procedure. The above-mentioned various setting values that are set here on the device include, for example, the telephone number of the host computer, and the total copy count.

Typically, the host computer is provided with a database like:

| | Before Initialization | After Initialization |
|---|---|---|
| Copier ID number | 0001 | 0001 |
| Check Code | 123456 | 123456 |
| Initialization Date/Time | **** | 95-06-15 15:30 |

The initialization date/time field contains asterisks before initialization, and it is filled with a particular date/time during initialization.

Revert to FIG. 6. In step #35, the device D communicates with the host computer H to effect various settings, and, in step #40, the device D stores the copier ID number received from the host computer H into the copier ID area in the RAM 26. Thereafter, in step #45, the device D receives a signal indicating the termination of initialization from the host computer H and disconnects the telephone line. Subsequently, in step #50, the device D notifies the copier P of the termination of initialization, and thus terminates initialization. Note that, when the host computer H has aborted initialization, it does not transmit the various settings and the copier ID number in steps #35 and #40.

Apparently, it seems possible to simplify the initialization procedure by conducting initialization using only the copier ID number, instead of the check code, as the single code to be entered from the copier P. In reality, however, such a method, using the copier ID number alone, does not work when re-initialization needs to be conducted.

Re-initialization is necessary, for example, when a failure of communication between the copier P and the device D has blocked notification of completion of initialization, that is, when completion of initialization cannot be confirmed, or when some trouble that occurred after the copier was brought into operation has necessitated reestablishment of the conditions set between the device D and the host computer H. In these cases initialization needs to be conducted again.

Figure 8:
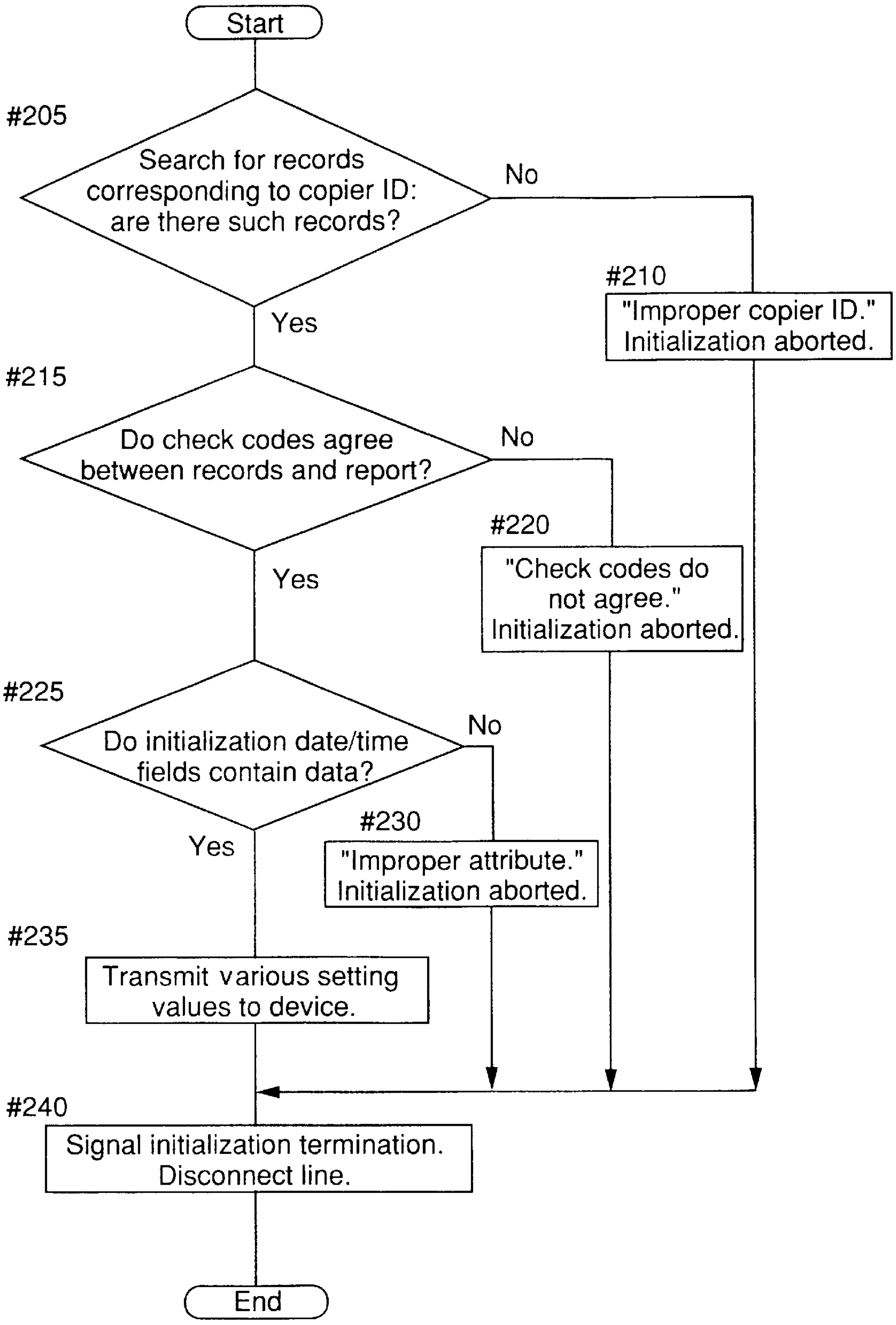
FIG. 8 is a flowchart showing the initialization procedure followed by the host computer when re-initialization is conducted.

FIG. 8 shows the initialization procedure followed by the host computer when re-initialization is conducted. In re-initialization, first, in step #205, the host computer H searches its database for any records corresponding to the copier ID number received from the device D. If there exist no such records, then, in step #210, the host computer H aborts initialization, indicating that the copier ID number is improper, and thus terminates the procedure. If there exist any such records in the database, then, in step #215, the host computer H compares the check code of those records with that of the initialization report. If the two check codes do not agree, then, in step #220, the host computer H aborts initialization, indicating a message "check code do not agree", and thus terminates the procedure.

If the check code of the records and that of the initialization report agree, then, in step #225, the host computer H judges whether the initialization date/time fields contain any data or not. If there exists no data in the initialization date/time fields, then, in step #230, the host computer H aborts initialization, indicating a message "improper attribute", and thus terminates the procedure. If there exists any data in the initialization date/time fields, then, in step #235, the host computer H transmits various setting values to the device D. Subsequently, in step #240, the host computer H notifies the device D of completion of initialization and disconnects the telephone line.

As described above, if re-initialization is attempted on the basis of the copier ID number alone, it fails, because the already registered initialization dates/times serve as protection against re-initialization. This is a precaution taken to prevent damage to other databases already in operation. More specifically, if the device D is connected to the host computer H on the basis of the copier ID number alone, entry of a wrong copier ID number can result in writing data in the database for another copier.

In contrast, in initialization on the basis of a check code, once initialization is conducted, the same copier ID number as registered in the host computer H is registered in the device D. Accordingly, in re-initialization, the terminal device D, while communicating with the host computer H, can allow the host computer H to recognize that what is about to be conducted is re-initialization, since the correct copier ID number is already registered in the copier ID area. In re-initialization, therefore, it is possible to check the identity of the copier doubly or triply by judging whether any initialization dates/times are already registered, and whether the check code searched for in the database on the basis of the copier ID and the check code entered from the device agree or not. This provides the same degree of data protection as in the conventional initializing method which is provided with preventive measures against errors in initialization operation.

Moreover, even in case a wrong check code is entered and it accidentally agrees with the check code of the database for a copier that has not yet been initialized, the worst consequences, such as damage to databases already in operation, can be avoided, since it is a yet-to-be initialized database that is damaged.

Figure 9:
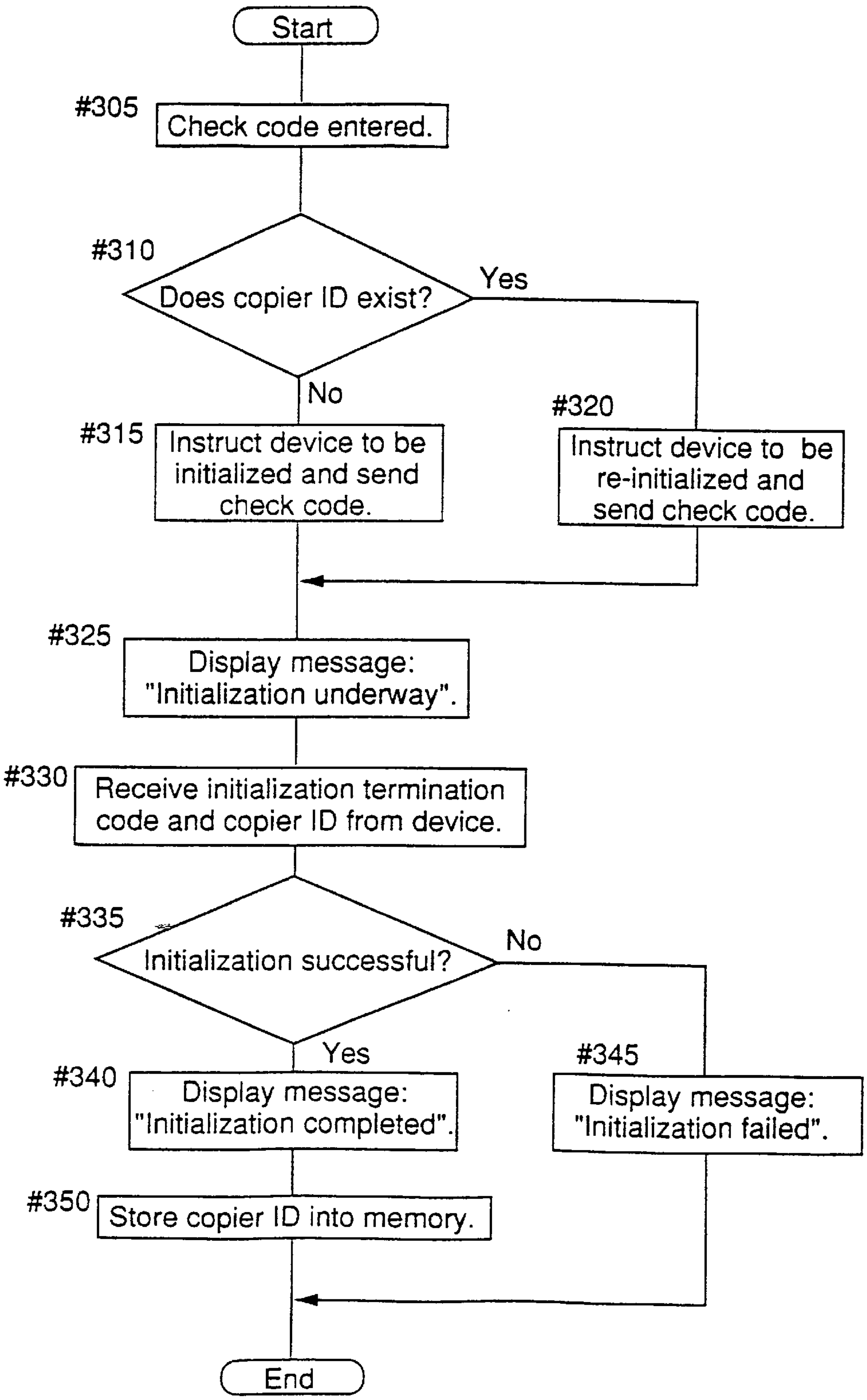
FIG. 9 is a flowchart showing the operation of the control section of the copier after device initialization is selected in the service simulation mode.

Initialization of the device can be selected from the control section 17 of the copier P in its service simulation mode. FIG. 9 shows the operation of the control section 17 when device initialization is selected in that mode. Specifically, in step #305, the control section 17 confirms that the check code issued by the host computer H has been entered, and then, in step #310, it judges whether the copier ID area in the storage section 19 contains a copier ID number or not. If there exists no copier ID number, then, in step #315, the control section 17 instructs the device D to conduct initialization and transmits thereto the entered check code. If there exists a copier ID number in the copier ID area, then, in step #320, the control section 17 instructs the device D to conduct re-initialization and transmits thereto the check code.

Next, in step #325, while the device D and the host computer H are conducting initialization, the control section 17 displays a message "initialization underway" on the display section of the operation panel 18. In step #330, the control section 17 receives an initialization completion code and a copier ID number from the device D, and, in step #335, it judges initialization results as obtained from the received data. If the control section 17 recognizes the initialization as a success, then, in step #340, it displays a message "initialization completed" on the display section. If the control section 17 recognizes the initialization as a failure, then, in step #345, it displays a message "initialization failed" on the display section. Subsequently, in step #350, the control section 17 stores the copier ID number received from the device D into the storage section 19, and thus terminates the initialization.

Note that, in the above described initialization procedure, a judgment whether the device D is about to be initialized for the first time or about to be re-initialized is made on the basis of whether the copier ID area in the device D is "0" or not. This is because the copier ID area cannot be guaranteed to be "0" unless a first-time initialization is conducted after the whole RAM 26 in the device D has been cleared in advance.

It is usually stated in the installation manual that the memory needs to be cleared before installation of the device D, but, even then, the memory may accidentally be left uncleared. To prevent this, it is customary, when the device D is initialized, to clear the memory also by software before various data is transmitted to the device D. However, clearing the memory in such a way means clearing the copier ID area as well, and accordingly this makes it impossible to judge whether initialization is about to be conducted for the first time or not. Note that the present invention presupposes that, according to the installation manual, the memory is cleared before installation of the device D.

Figure 10:
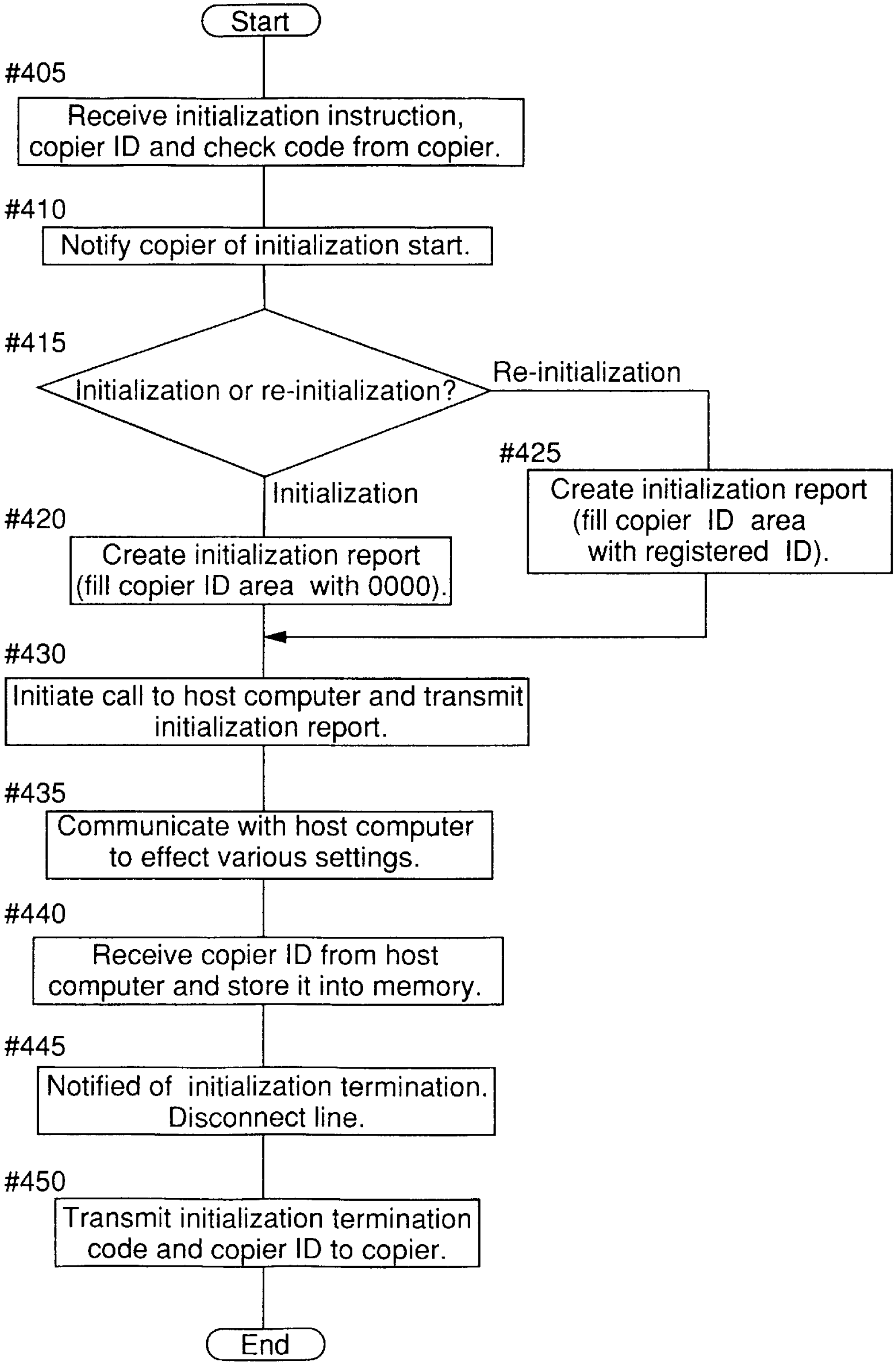
FIG. 10 is a flowchart showing the initialization procedure followed by the device when it is instructed by the copier to conduct initialization or re-initialization.

To solve these practical problems, it is desirable that the device D conduct initialization following the procedure shown in FIG. 10 when it is instructed to conduct initialization or reinitialization by the copier P. Specifically, in step #405, when the device D is instructed to conduct initialization by the copier P and receives a copier ID number and a check code therefrom, then, in step #410, it transmits to the copier P a signal indicating that initialization is about to be conducted. Subsequently, in step #415, the device D judges whether initialization is about to be conducted for the first time or not.

If initialization is conducted for the first time, then, in step #420, the device D creates an initialization report. In this case, the copier ID area in the device D is filled with "0000". If re-initialization is conducted, then, in step #425, the device D creates an initialization report, filling its copier ID area, in this case, with an already registered copier ID number.

When a report has thus been created, then, in step #430, the device D initiates a call to the host computer H to transmit the report. Thereafter, in step #435, the device D communicates with the host computer H to effect various settings, and then, in step #440, it stores the copier ID number received from the host computer H into the copier ID area in the RAM 26. Thereafter, in step #445, when the device receives a signal indicating completion of initialization from the host computer H, it disconnects the telephone line. Note that, when the host computer has aborted initialization, it does not transmit the various setting and the copier ID number in steps #435 and #440.

In this case, the host computer H conducts initialization following the same procedure as shown in FIG. 7, and therefore no description will be given here in this respect.

As described above, according to the above initialization procedure, the storage section 19 of the copier P keeps a record of whether the device D has already been initialized or not, so that the copier P itself can judge whether initialization is about to be conducted for the first time or not. Accordingly, the memory can be cleared any time when necessary.

Note that the present invention is applicable not only to copiers but also to other types of image forming equipment such as laser printers and facsimile machines. Moreover, the actual items included in the initialization data are not restricted to those shown as examples in the above described embodiment.

As described above, the present invention has the following features. In the terminal device, under the condition that initialization has not yet been conducted, an initialization report is created solely based on a check code that is received from a managed piece of equipment during initialization and that identifies the managed piece of equipment. And, when re-initialization is conducted, an initialization report is created based on at least three factors that are a check code, an ID number identifying the managed piece of equipment, and a condition that initialization has already been conducted.

On the other hand, in the host computer, a report received from the terminal device is first analyzed. Then, an equipment management database is searched for based on said check code when the analysis result shows that the report does not include an ID number, and the terminal device is initialized only when that database has not yet been initialized. Moreover, the terminal device is re-initialized when the report analysis result shows that the report includes an ID number.

As a result, in initialization on the basis of a check code alone, once initialization is conducted, the same ID number as that registered in the host computer is registered in the terminal device. Accordingly, when re-initialization is conducted, the terminal device, while communicating with the host computer, can allow the host computer to recognize that what is about to be conducted is re-initialization, since the correct ID number is already registered in the ID area of the terminal device. Moreover, even in case a wrong check code is entered and it accidentally agrees with the check code of the database for a managed piece of equipment that has not yet been initialized, the worst consequences, such as damage to databases already in operation, can be avoided, since it is a yet-to-be initialized database that is damaged.

Furthermore, according to the present invention, one of the conditions that indicate completion of initialization is initialization date and time, and the terminal device is not initialized when initialization date and time are detected in the report. As a result, in re-initialization, initialization is not actually conducted, since the report includes initialization date and time. Thus, it is possible to eliminate damage being caused to other databases already in operation.

As described above, according to the present invention, only a check code needs to be entered from the operation section of the copier. This allows the code to be entered more easily and with less possibility of errors being made than in any conventional system.

Obviously, many modifications and variations of the present invention are possible in light of the above teachings. It is therefore to be understood that within the scope of the appended claims, the invention may be practiced other than as specifically described.

What is claimed is:

1. An equipment management system comprising a terminal device that is attached to a managed piece of equipment so as to transmit equipment management data needed for managing that managed piece of equipment and a host computer that is connected to said terminal device by way of a data communication line so as to collectively manage equipment management data related to said terminal device, said host computer setting initial data on said terminal device, wherein said terminal device comprises:

a first report creating means which, under a condition that initialization has not yet been conducted, creates an initialization report solely based on a check code that is received from said managed piece of equipment during initialization and that identifies the managed piece of equipment; and a second report creating means which, when re-initialization is conducted, creates an initialization report based on at least three factors that are said check code, an ID number identifying said managed piece of equipment, and a condition that initialization has already been conducted, and wherein said host computer comprises:

a report analyzing means for analyzing a report received from said terminal device;

an initializing means which searches for an equipment management database based on said check code when an analysis result of said report analyzing means shows that said report does not include an ID number and which initializes said terminal device only when that database has not yet been initialized; and a re-initializing means which re-initializes said terminal device when an analysis result of said report analyzing means shows that said report includes an ID number.

2. An equipment management system as claimed in claim 1, wherein the condition that initialization has already been conducted in said report creating means of said terminal device is initialization date and time, and wherein said host computer does not initialize said terminal device when said report analyzing means has detected initialization date and time in said report.

* * * * *